United States Patent
Hanai et al.

(10) Patent No.: US 10,027,931 B2
(45) Date of Patent: *Jul. 17, 2018

(54) VIRTUAL IMAGE GENERATING APPARATUS, VIRTUAL IMAGE GENERATING METHOD, AND RECORDING MEDIUM STORING VIRTUAL IMAGE GENERATING PROGRAM

(71) Applicant: OLYMPUS CORPORATION, Hachioji-shi, Tokyo (JP)

(72) Inventors: Takako Hanai, Tachikawa (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,935

(22) Filed: Oct. 3, 2017

(65) Prior Publication Data
US 2018/0041734 A1 Feb. 8, 2018

Related U.S. Application Data

(63) Continuation of application No. 15/228,927, filed on Aug. 4, 2016, now Pat. No. 9,807,354, which is a
(Continued)

(30) Foreign Application Priority Data

Feb. 5, 2008 (JP) .................................. 2008-25429
Feb. 15, 2008 (JP) .................................. 2008-35219

(51) Int. Cl.
*H04N 7/18* (2006.01)
*G06T 11/60* (2006.01)
(Continued)

(52) U.S. Cl.
CPC ........... *H04N 7/183* (2013.01); *G06T 3/0056* (2013.01); *G06T 11/60* (2013.01); *G06T 19/006* (2013.01);
(Continued)

(58) Field of Classification Search
CPC .......... H04N 2/00; G06T 17/60; G06T 3/0056
See application file for complete search history.

(56) References Cited

U.S. PATENT DOCUMENTS 5,736,982 A * 4/1998 Suzuki ................... G06T 15/30
348/E7.083
2003/0007668 A1* 1/2003 Kotake ................. G01C 21/26
382/113
(Continued)

FOREIGN PATENT DOCUMENTS

CN 1699924 A 11/2005
EP 1796099 A1 6/2007
(Continued)

OTHER PUBLICATIONS

Office Action dated Dec. 13, 2011 in counterpart Japanese Patent Application No. 2008-025429.
(Continued)

*Primary Examiner* — Lashonda Jacobs
(74) *Attorney, Agent, or Firm* — Volpe and Koenig, P.C.

(57) ABSTRACT

An image generation apparatus, system, and method that include a position detector that acquires photography position information, a communicator that acquires at least one surrounding map image viewable from the photography position when a captured image is captured, and an image generator that generates at least one virtual image of a selected avatar image and the at least one surrounding map image.

19 Claims, 12 Drawing Sheets

Related U.S. Application Data continuation of application No. 14/175,854, filed on Feb. 7, 2014, now Pat. No. 9,412,204, which is a continuation of application No. 12/364,574, filed on Feb. 3, 2009, now Pat. No. 8,717,411.

(51) Int. Cl.
| | |
|---|---|
| *G06T 3/00* | (2006.01) |
| *G06T 19/00* | (2011.01) |
| *H04N 21/00* | (2011.01) |
| *G06F 17/30* | (2006.01) |
| *G06T 15/20* | (2011.01) |
| *H04L 29/08* | (2006.01) |

(52) U.S. Cl.
CPC ............... *H04N 7/18* (2013.01); *H04N 21/00* (2013.01); *G06F 17/30247* (2013.01); *G06T 15/205* (2013.01); *H04L 67/02* (2013.01)

(56) References Cited

U.S. PATENT DOCUMENTS

| | | | |
|---|---|---|---|
| 2003/0107569 A1* | 6/2003 | Endo | G06T 15/205 345/419 |
| 2004/0098175 A1* | 5/2004 | Said | G01C 21/3632 701/1 |
| 2004/0218894 A1* | 11/2004 | Harville | G06F 17/30241 386/241 |
| 2007/0055441 A1* | 3/2007 | Retterath | G01C 21/3647 701/532 |
| 2008/0133526 A1* | 6/2008 | Haitani | G06F 17/30265 |
| 2008/0133697 A1* | 6/2008 | Stewart | H04M 1/72522 709/217 |
| 2008/0249396 A1* | 10/2008 | Biglieri | A61B 5/0555 600/411 |
| 2010/0156906 A1* | 6/2010 | Montgomery | G06T 15/205 345/427 |
| 2012/0062779 A1* | 3/2012 | Sambongi | H04N 1/00132 348/333.02 |

FOREIGN PATENT DOCUMENTS

| | | |
|---|---|---|
| JP | 10-151223 | 6/1998 |
| JP | 2000-50156 | 2/2000 |
| JP | 2000-057320 | 2/2000 |
| JP | 2001-070473 | 3/2001 |
| JP | 2002-251396 | 9/2002 |
| JP | 2003-111867 | 4/2003 |
| JP | 2004-139576 | 5/2004 |
| JP | 2005-064681 | 3/2005 |
| JP | 2005-094741 | 4/2005 |
| JP | 2005-122100 | 5/2005 |
| JP | 2005-128298 | 5/2005 |
| JP | 3694663 B2 | 9/2005 |
| JP | 2005-277670 | 10/2005 |
| JP | 2005-316995 | 11/2005 |
| JP | 2006-309722 | 11/2006 |
| JP | 2007-189357 | 7/2007 |
| JP | 2007-286909 | 11/2007 |
| WO | 2006106437 A1 | 10/2006 |

OTHER PUBLICATIONS

Office Action dated Jan. 17, 2012 in counterpart Japanese Patent Application No. 2008-035219.

Suzuki, Tetsuya, "Development of a System to Search Locations of Landscape Photographs", Research Report of the Information Processing Society, Japan, Information Processing Society of Japan, Jan. 27, 2006, vol. 2006, No. 11, pp. 1-8.

Office Action from counterpart Chinese Patent Application No. 200910006169.7 dated Sep. 5, 2012.

Office Action dated May 31, 2013 in counterpart Japanese Patent Application No. 2012-169044.

* cited by examiner

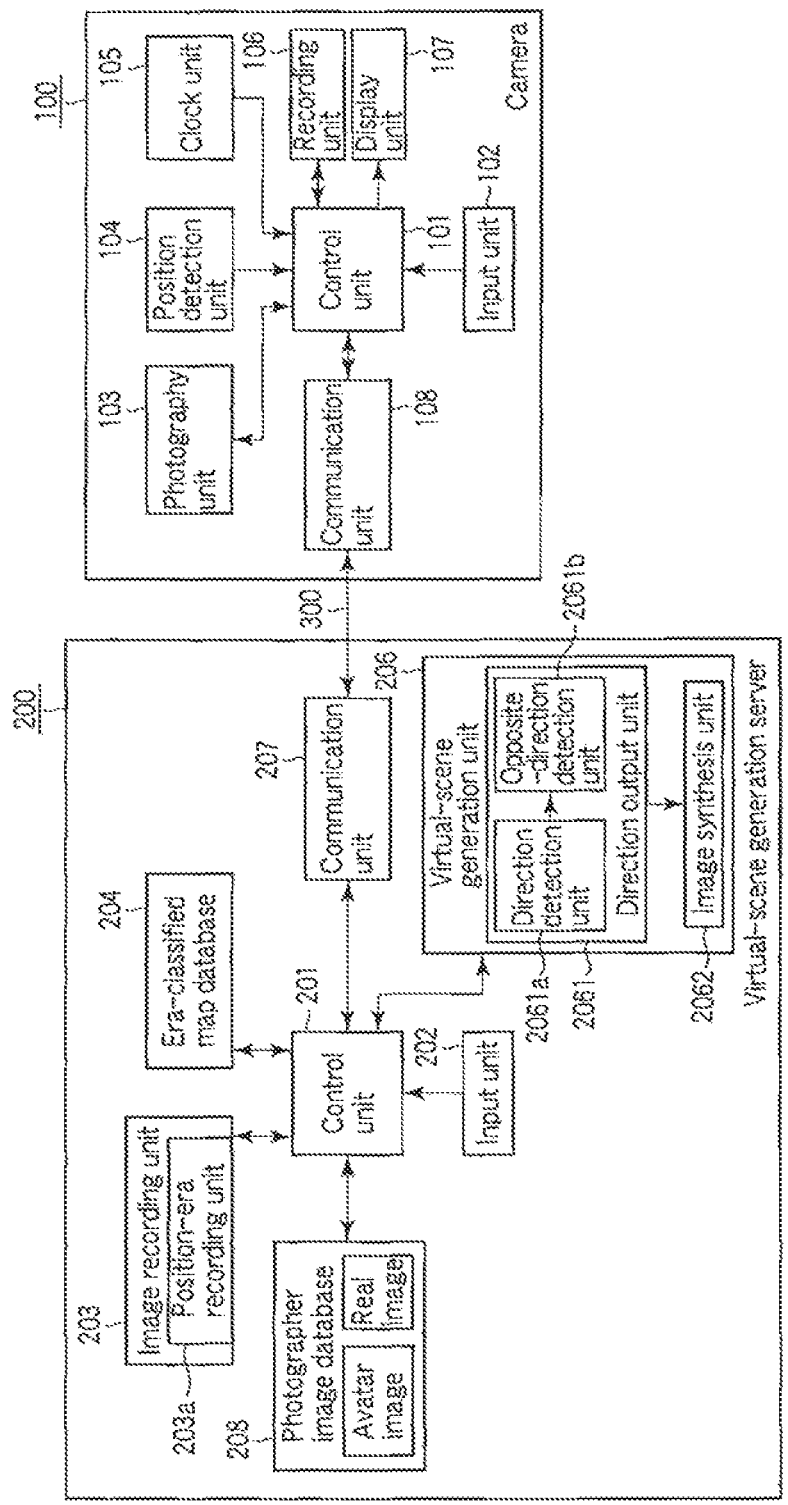
F I G. 8

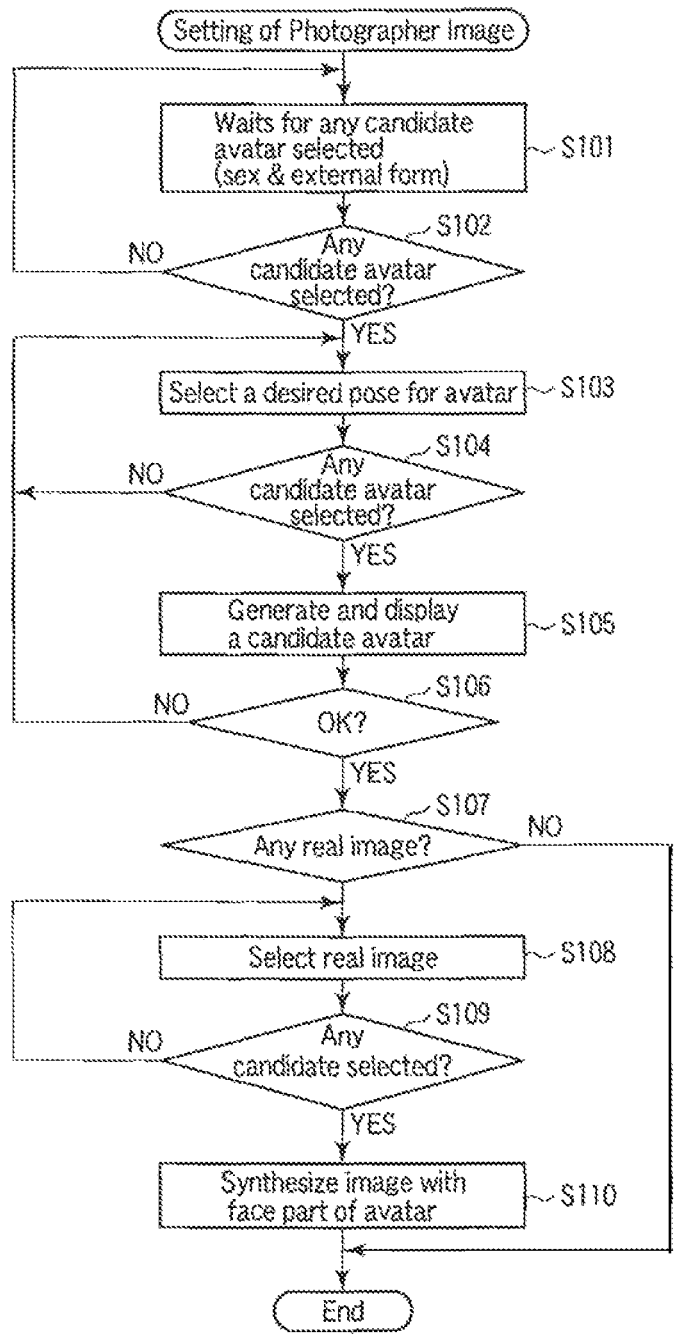
F I G. 11

VIRTUAL IMAGE GENERATING APPARATUS, VIRTUAL IMAGE GENERATING METHOD, AND RECORDING MEDIUM STORING VIRTUAL IMAGE GENERATING PROGRAM

CROSS REFERENCE TO RELATED APPLICATIONS

This application is a continuation of U.S. patent application Ser. No. 15/228,927, filed Aug. 4, 2016, now U.S. Pat. No. 9,807,354, issued on Oct. 31, 2017, which is a continuation of U.S. patent application Ser. No. 14/175,854, filed Feb. 7, 2014, now U.S. Pat. No. 9,412,204, issued on Aug. 9, 2016, which is a continuation of U.S. patent application Ser. No. 12/364,574, filed Feb. 3, 2009, now U.S. Pat. No. 8,717,411, issued on May 6, 2014, which claims the benefit of priority from prior Japanese Patent Application No. 2008-025429, filed Feb. 5, 2008, and Japanese Patent Application No. 2008-035219, filed Feb. 15, 2008, the entire contents of which are incorporated herein by reference.

BACKGROUND OF THE INVENTION

1. Field of the Invention

The present invention relates to a virtual image generation apparatus and a virtual image generation method, designed to reproduce a route of a photographer's travel on a map image from image data containing the data representing the position where the picture represented by the image data has been taken. The invention also relates to a recording medium storing a virtual image generation program.

2. Description of the Related Art

In recent years, various types of service of displaying 3D maps such as Google (™) Maps are suggested. Further, various systems that can display computer graphics (CG) superposed on any photograph taken. Jpn. Pat. Appln. KOKAI Publication No. 2000-50156, for example, discloses a technique of determining, in a 3D map space, the position where a picture has been taken by a camera. The name of structure that should be seen in the picture is identified on the basis of the 3D map, the position and viewing angle the camera assumes when taking the picture, and the image pertaining to the name of the structure is superposed on the picture.

Jpn. Pat. Appln. KOKAI Publication No. 2005-128298, for example, discloses the technique of synthesizing a real image with a CG image, providing, for example a live golf-tournament scene in which represent the undulating ground vividly.

BRIEF SUMMARY OF THE INVENTION

An aspect of the invention is directed to an image generation apparatus. The image generation apparatus comprises: an image recording unit that records at least one image containing photography position information corresponding to a photography position of the at least one image; an input unit for selecting a selected image from the at least one image recorded in the image recording unit; a map-image unit that acquires at least one map image corresponding to the photography position information of the selected image; a direction detection unit that detects a photography direction of the selected image from the photography position information and acquires at least one surrounding map image viewable from the photography position when the selected image was recorded; and a virtual image generation unit that generates at least one virtual image of a scene viewable from the photography position when the selected image was recorded based on the photography position information and the at least one surrounding map image.

Another aspect of the invention is directed to an image generation system. The image generation system comprises: an image database comprising at least one recorded image containing photography position information corresponding to a photography position and date and time that the recorded image is recorded by an imaging device; an input unit for selecting a selected image from the at least one recorded image; a map-image database that stores at least one map image corresponding to the photography position information of the selected image; a direction detection unit that detects a photography direction of the selected image from the photography position information and acquires at least one surrounding map image viewable from the photography position when the selected image was recorded; and a virtual image generation unit that generates at least one virtual image in any direction viewable from the photography position when the selected image was recorded based on the photography position information and the at least one surrounding map image.

Another aspect of the invention is directed to an image generation method. The image generation method comprises: recording at least one image containing photography position information corresponding to a photography position when the image was recorded; selecting a selected image from the at least one image; acquiring at least one map image corresponding to the photography position information contained in the selected image; acquiring at least one surrounding scene viewable from the photography position consistent with a date and time that the selected image was recorded; and generating at least one virtual image of the surrounding scene viewable from the photography position when the selected image was recorded.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 8 is a diagram showing a virtual scene display system including a virtual image generation apparatus according to a second embodiment of this invention;

FIG. 11 is a flowchart explaining a process of setting a photographer image;

DETAILED DESCRIPTION OF THE INVENTION

Embodiments of the present invention will be described with reference to the accompanying drawings.

First Embodiment

Figure 1:
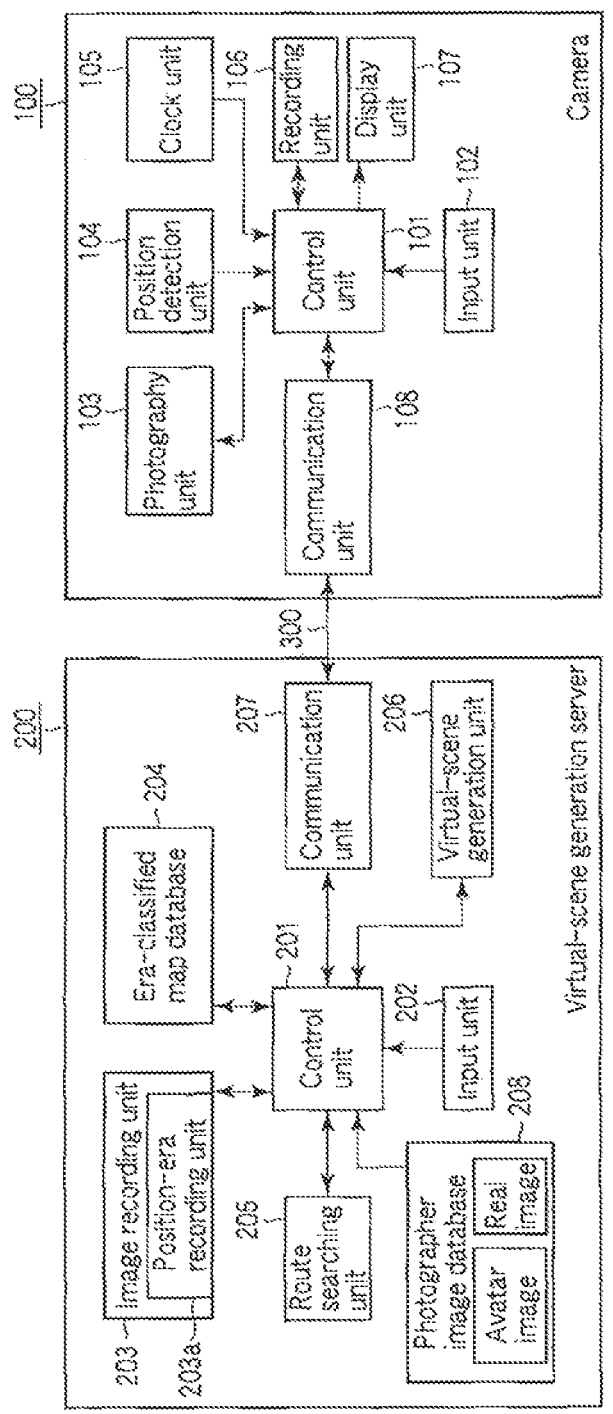
FIG. 1 is a diagram showing the configuration of a virtual travel display system that includes a virtual image generation apparatus according to a first embodiment of this invention.

FIG. 1 is a diagram showing the configuration of a virtual travel display system that includes a virtual image generation apparatus according to a first embodiment of the present invention. The virtual travel display system of FIG. 1 comprises a camera 100, a virtual-scene generation server, and a communication line 300. The communication line 300 connects the camera 100 and the virtual-scene generation server to each other. The camera 100 and the server can therefore communicate with each other. The communication line 300 is a general-purpose line such as the Internet line.

The camera 100 has a control unit 101, an input unit 102, a photography unit 103, a position detection unit 104, a clock unit 105, a recording unit 106, a display unit 107, and a communication unit 108.

The control unit 101 is configured to control the entire camera 100. The control unit 101 performs various controls in accordance with the user's operation at the input unit 102. The input unit 102 has various operation members, such as a power switch, a release button, a playback button, a memory-playback button, and a cross button. The user may push the power switch to turn on or off the power supply of the camera 100, the release button to instruct the camera 100 to take a picture, the user may push memory-playback button to instruct the camera 100 to reproduce memorial images (as will be described later in detail), and the cross button to select an desired operation the camera 100 may perform.

When controlled by the control unit 101, the photography unit 103 photographs an object, acquiring an image of the object. The position detection unit 104 is constituted by, for example, a GPS, and detects the position (i.e., latitude and longitude) of the camera 100 which takes at the time of photographing the object. The clock unit 105 detects the day and time the photography unit 103 takes any picture.

The position detection unit 104 and the clock unit 105 need not absolutely be incorporated in the camera 100. For example, the user may wear a wrist watch incorporating a GPS or carry a dedicated navigation device. In this case, the camera 100 can acquire the position data and time data detected by either the wrist watch or the navigation device.

The recording unit 106 is, for example, a memory card that is removably inserted in the camera 100. The recording unit 106 records the image acquired in the photography unit 103, in association with the photography position and photography date-time which have been acquired, respectively, in the position detection unit 104 and the clock unit 105. Under control of the control unit 101, the display unit 107 can display various images, such as the image represented by the data recorded in the recording unit 106.

The communication unit 108 performs various processes so that the camera 100 may achieve communication with the virtual scene generation server 200.

The virtual-scene generation server 200 has a control unit 201, an input unit 202, an image recording unit 203, an era-classified map database 204, a route searching unit 205, a virtual-scene generation unit 206, and a communication unit 207. The virtual-scene generation unit 206 is a computer that has a huge database and can therefore record map-image data items about various regions. It is desirable that the virtual-scene generation server 200 be connected to the Internet. If connected to the Internet, the virtual-scene generation server 200 enables the user to utilize the information available at various sites on the Internet. Further, the camera 100 may be designed to perform the function of the virtual-scene generation server 200. Moreover, the virtual-scene generation server 200 may be a device, such as a home-use game device, which can receive data such as the image data recorded in the recording unit 106.

The control unit 201 controls various processes in the virtual-scene generation server 200. If the user operates the input unit 202, inputting an instruction, the control unit 201 can perform a process in accordance with the instruction. The input unit 202 includes various operation members the user may operate to activate the virtual-scene generation server 200.

The image recording unit 203 records the image data transmitted from the camera 100 via the communication line 300. The image recording unit 203 is constituted by, for example, a hard disk drive that has a larger storage capacity than the recording unit 106 of the camera 100. In this embodiment, the image recording unit 203 has a record area in the form of a position-era recording unit 203a. The position-era recording unit 203a is a record area in which the position where each image is photographed and the date and time (i.e., photography era) when the image is photographed are recorded in association.

The era-classified map database 204 is a database that holds 2D and 3D map images, which are classified in accordance with the eras when they were photographed. The era-classified map database 204 may be provided in the image recording unit 203 or in another recording medium. The term "map image" means any scene image identified with a location represented on the map.

The communication unit 207 performs a variety of processes, under control of the control unit 201, enabling the virtual-scene generation server to communicate with the camera 100.

The route searching unit 205 receives two (or more) images the user has selected and specifies the route in which the user seems to have moved during the period between the time of photographing one image and the time of photographing the other image. The virtual-scene generation unit 206 generates a map image (a 2D or 3D map image) pertaining to the route the route searching unit 205 has specified. Further, the virtual-scene generation unit 206 synthesizes an avatar (i.e., alter ego of the user), which is superposed on the map image it has generated.

The virtual-scene generation server has a photographer image database 208, which is a database that holds the image of the user (photographer). The photographer image recorded in the photographer image database 208 is an avatar. The avatar is either a photographer image the photographer has registered or a character image that is the photographer's alter ego and already registered in the virtual-scene generation server. The user may operate the input unit 202 or the input unit 102 of the camera 100, thereby to select his or her registered image or the avatar as image that should be synthesized with the virtual scene image that will be generated in the process of reproducing memorial images, which will be described later.

Figure 2:
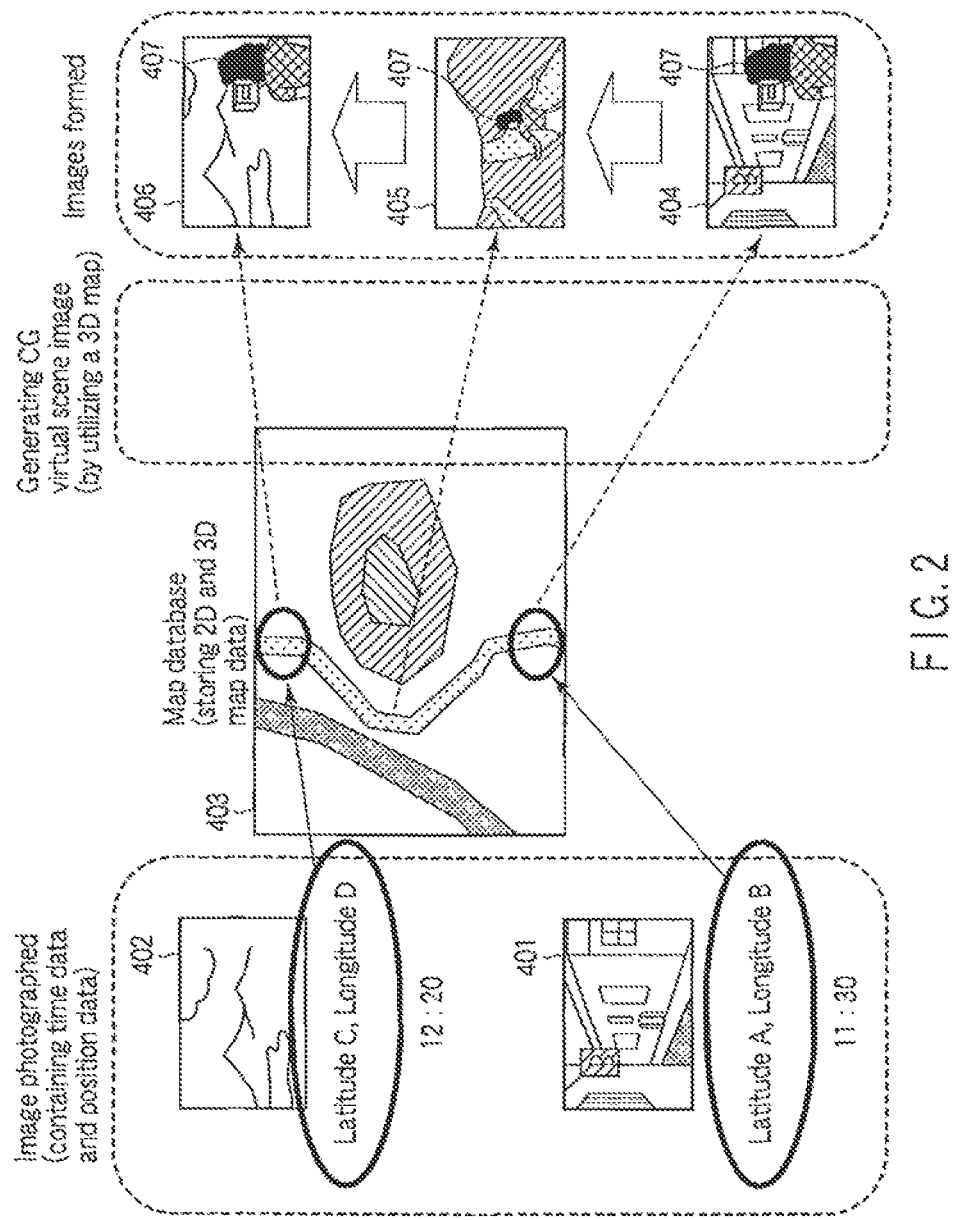
FIG. 2 is a diagram outlining how the virtual travel display system of FIG. 1 operates.

The operation the virtual travel display system of FIG. 1 will be briefly explained. FIG. 2 is a diagram that outlines how this virtual travel display system operates.

In the present embodiment, when an object is photographed, the image data about the object is recorded in the recording unit 106, in association with the photography position data and photography date-time data.

Next, the user operates the input unit 102, setting the camera 100 to the memorial-image reproduction mode. The user then selects at least two of the images recorded in the recording unit 106 of the camera 100. The images selected are transmitted from the camera 100 to the virtual-scene generation server. In the instance shown in FIG. 2, an image 401 taken at 11:30 at latitude A and longitude B and an image 402 taken at 12:20 at latitude C and longitude D are selected.

When the server receives the images 401 and 402, a 2D map image 403 showing the photography positions of the images 401 and 402 are acquired from the era-classified map database 204. The photography positions of the images 401 and 402 may be remote from each other. In this case, the scale of the 2D map image 403 is suppressed, whereby both images 401 and 402 appear in the 2D map image 403. Thereafter, the route searching unit 205 determines the route the user has traveled from the photography position of the image 401 to that of the image 402, from the time spent for the traveling (i.e., difference between the time of photography image 401 and the time of photography image 402) and the distance traveled (i.e., distance between the photography positions of images 401 and 402).

After the route has been so determined, the virtual-scene generation unit 206 generates a plurality of images (virtual scene images) 404 to 406 showing the locations along the route determined, from the 3D map image pertaining to the route. Further, an avatar 407 is synthesized, if necessary, with the virtual scene images 404 to 406.

Now that the virtual scene images 404 to 406 have been generated, the user can view the scenes that may have seen while walking from the position where he or she took the image 401 and the position he or she took the image 402, though the user has actually photographed at two positions only. Viewing the scene images 404 to 406 shown in FIG. 2, the user can remember the scenery he or she saw while walking from the position of image 404 where the building (image 401) was photographed to the position of image 406 where the mountains (image 402) were photographed. More specifically, the user can remember the various events at the time of taking the picture.

Instead of the images 404 to 406, a 2D map image 403 may be displayed. Alternatively, the 2D map image 403 and the images 404 to 406 may be displayed, side by side.

How the virtual travel display system of FIG. 1 operates will be explained in more detail.

Figure 3:
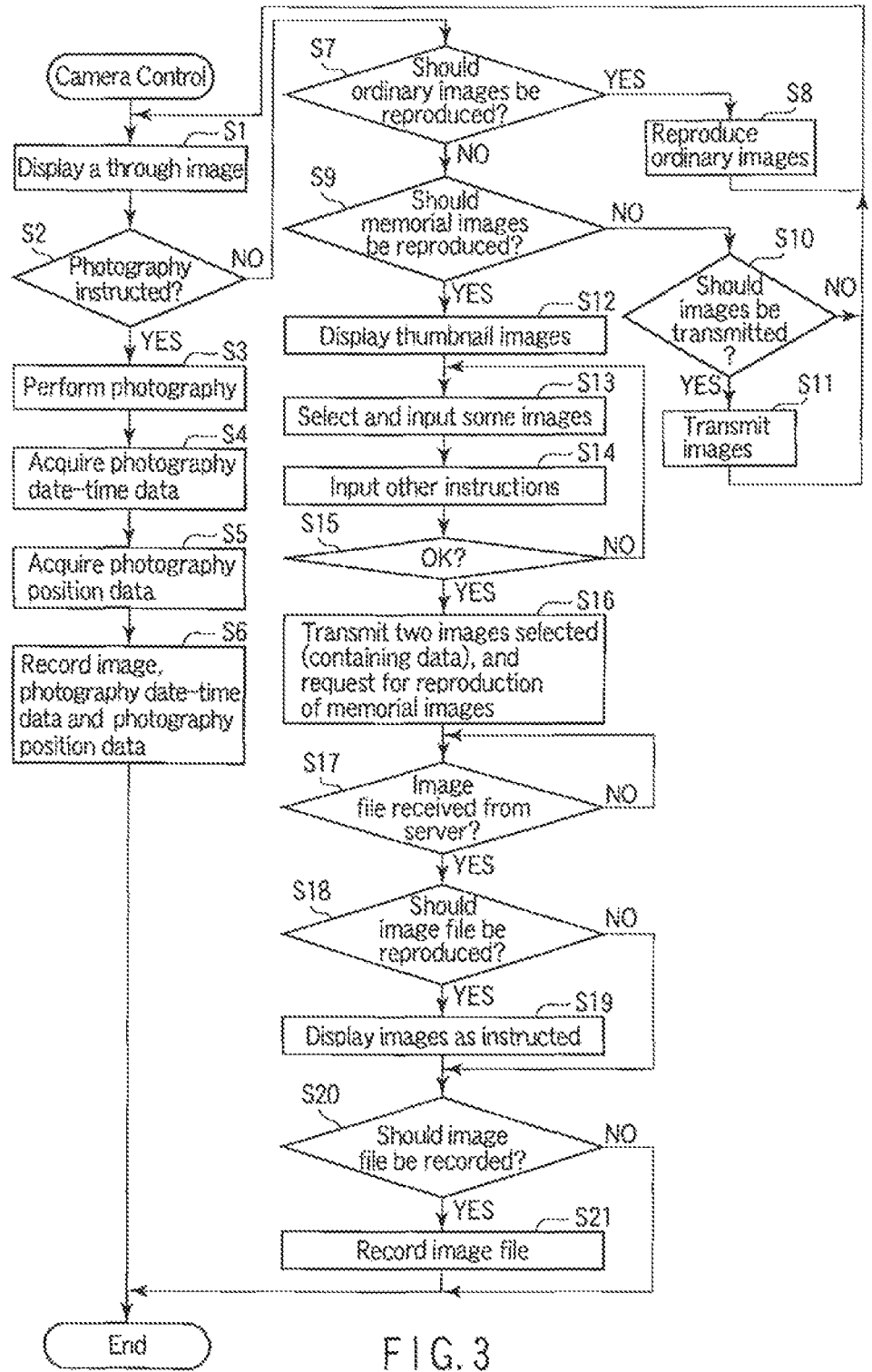
FIG. 3 is a flowchart explaining how a camera operates in the virtual travel display system.

FIG. 3 is a flowchart explaining how the camera 100 works in the virtual travel display system of FIG. 1. The user may turn on the power switch at the input unit 102, supplying power to the camera 100. Then, the operation sequence shown in FIG. 3 is started.

When the power switch is turned on, the control unit 101 causes the photography unit 103 to operate. The control unit 101 then causes the display unit 107 to display the images acquired by the photography unit 103, one after another, achieving a so-called through image display (Step S1). After the though image display is thus performed, the control unit 101 determines whether the user has pushed the release button at the input unit 102 to input a photography instruction (Step S2).

If the photography instruction has been input in Step S2, the control unit 101 operates the photography unit 103, which acquires image data items about objects (Step S3). The control unit 101 then performs various processes on these image data items. Thereafter, the control unit 101 acquires the photography date-time data the clock unit 105 detected when the objects were photographed (Step S4). Then, the control unit 101 acquires the photography position data the position detection unit 104 detected when the objects were photographed (Step S5). The recording unit 106 records the image data associated with the photography date-time data and the photography position data (Step S6).

If the photography instruction has not been input in Step S2, the control unit 101 determines whether the user has pushed the playback button at the input unit 102, instructing reproduction of ordinary images (Step S7). If the playback button has been pushed, instructing the reproduction of ordinary images, the control unit 101 performs a process of reproducing ordinary images (Step S8). More precisely, the control unit 101 causes the display unit 107 to display the thumbnail images represented by the image data recorded in the recording unit 106. The control unit 101 then causes the display unit 107 to display the image associated with any thumbnail image the user has selected. Alternatively, the camera 100 may reproduce any image recorded in the image recording unit 203 of the virtual-scene generation server. If this is the case, the camera 100 requests the virtual-scene generation server to reproduce images. In response to this request, the server transmits the thumbnail image data items to the camera 100. In the camera 100, the display unit 107 displays the thumbnail images. If the user selects any one of the thumbnail images displayed, the image data associated with the selected thumbnail image is transmitted from the virtual-scene generation server to the camera 100. In the camera 100, the display unit 107 displays the image this data represents.

In Step S7, the playback button may be found not pushed at the input unit 102. In this case, the control unit 101 determines whether the memory-playback button has been pushed at the input unit 102 (Step S9). In Step S9, the memory-playback button may not be found pushed. Then, the control unit 101 determines whether the user has operated the input unit 102 to instruct that the image data should be transmitted (Step S10). If no instructions for transmitting the image data have been made in Step S10, the process will return to Step S1. In Step S1, the control unit 101 performs the through image display. If an instruction for transmitting the image data has been made in Step S10, the control unit 101 performs a process to transmit image data (Step S11). That is, the control unit 101 makes the display unit 107 display the thumbnail images represented by the data items stored in the recording unit 106, enabling the user select any desired thumbnail image. Then, the image data representing the thumbnail image selected is transmitted to the virtual-scene generation server.

In Step S9, the memory-playback button may be found pushed. If this is the case, the control unit 101 performs a process to reproduce memorial images. First, the control unit 101 causes the display unit 107 to display the thumbnail images of the images stored in the recording unit 106 (Step S12). Next, the control unit 101 prompts the user to select at least two of the thumbnail images (Step S13). The user can select as many thumbnail images as he or she wants, probably those images photographed at close dates and times (of the same era) and at different positions.

The description that follows is based on the assumption that the user has selected two thumbnail images. After the two thumbnail images have been selected in Step S13, the control unit 101 prompts the user to make an instruction other than the image selection in the memorial-image reproduction mode (Step S14). More specifically, the control unit 101 enables the user to instruct that a direction be set, in which to view the map image on the display unit 107 or that an avatar be synthesized with the map image.

Thereafter, the control unit 101 determines whether the user has operated the input unit 102, making the instruction (Step S15). If no instructions have been made in Step S15, the process will return to Step S13. Thus, the control unit 101 waits until the user selects images or an instruction other than the image selection. On the other hand, if any instruction has been made in Step S15, the control unit 101 transmits the data items representing the selected two images, to the virtual-scene generation server. The control unit 101 then transmits a request for memorial-image reproduction to the virtual-scene generation server (Step S16). At this point, the various setting data items generated in Step S14 are transmitted, too, to the virtual-scene generation server (Step S16). An image file for use in reproducing memorial images is generated in the virtual-scene generation server, as will be explained later.

Thereafter, the control unit 101 determines whether the image file generated in the server has been received (Step S17). In Step S17, the control unit 101 keeps waiting for the image file. When the image file is found received, in Step S17, from the virtual-scene generation server, the control unit 101 notifies the user of this fact. The control unit 101 then determines whether the user has requested for generating a memorial image file again (Step S18). If this request has been made, the control unit 101 causes the display unit 107 to display the images included in the image file transmitted from the virtual-scene generation server, in accordance with the instructions the user inputs at the input unit 102 (Step S19). These images may be displayed in such a manner as in a slide show. Otherwise, the images may be automatically reproduced at a prescribed speed. If the images are so displayed, the user can enjoy seeing them, in the order they have been taken at different positions and at different times.

The user may not request for generating a memorial image file in Step S18. In this case, the control unit 101 skips Step S19.

In Step S10, the control unit 101 determines whether the user has operated the input unit 102, instructing that an image file should be recorded (Step S20). If this instruction is found to have been made, the control unit 101 stores the image file into the recording unit 106 (Step S21). If the instruction has not been made in Step S20, the control unit 101 skips Step S21.

Figure 4:
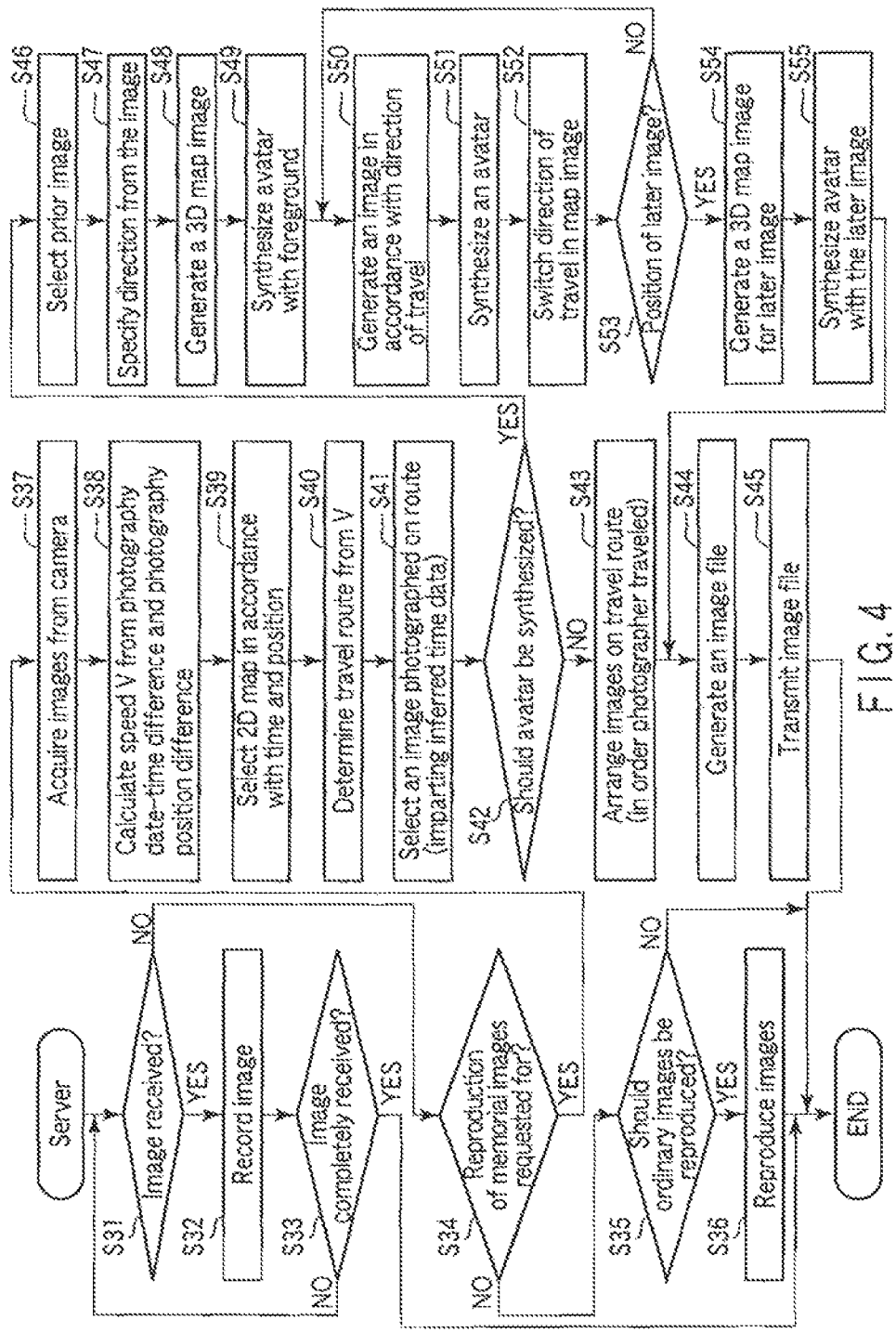
FIG. 4 is a flowchart explaining how a virtual-scene generation server operates in the virtual travel display system.

FIG. 4 is a flowchart explaining how the virtual-scene generation server operates in the virtual travel display system of FIG. 1. In the server, the control unit 201 determines whether image data has been received from the camera 100 before receiving a request for memorial-image reproduction (Step S31). If the request is found received, the control unit 201 causes the image recording unit 203 to record the image data (Step S32). Thereafter, the control unit 201 determines whether the reception of the image data from the camera 100 has been completed (Step S33). If the image data has not been completely received in Step S33, the process will return to Step S31. In Step S31, the control unit 201 waits for the image data coming from the camera 100.

In Step S31, no image data may be found received. In this case, the control unit 201 determines whether a request for memorial-image reproduction has been made along with a request for two image data items (Step S34). If a request for memorial-image reproduction has not been made in Step S34, the control unit 201 determines whether the camera 100 has requested for reproduction of ordinary images (Step S35). In Step S35, a request may be found made for ordinary-image reproduction. In this case, the control unit 201 transfers the images the user has selected, to the camera 100. In the camera 100, the display unit 107 of the camera 100 displays the images (Step S36).

In Step S34, a request for memorial-image reproduction may be found to have been made. In this case, the control unit 201 acquires the data items representing the two images, and transmitted from the camera 100 (Step S37). Next, the control unit 201 transmits the photography date-time data and the photography position data, both pertaining to the two images, to the route searching unit 205. The route searching unit 205 calculates the speed V at which the user traveled from one photography position to the other, from the difference between the photography date-time data items about the two images and from the difference between the photography position data items about the two images (Step S38). The control unit 201 selects the 2D map image that pertains to the same era as the two images were taken and shows the two positions where the two images were taken (Step S39). The control unit 201 then supplies the 2D map image selected to the route searching unit 205. Assume that the photography positions of the two images may be so remote from each other that both do not appear in the map image. Then, the scale of the 2D map image may be suppressed, whereby both images appear in the 2D map image. If the photography positions are, conversely, close to each other, the scale of the 2D map image may be extended. The route searching unit 205 determines the route and direction the user has traveled from the photography position of one image to that of the other image, from the speed V and the 2D map image time (Step S40).

The process of determining the route in which the user has traveled at speed V, i.e., Step S40, will be explained.

Figure 5:
FIG. 5 is a diagram a plurality of travel routes that exist in a virtual image.

In Step S39, the speed V is calculated from the difference between the photography date-time data items about the two images and from the difference between the photography position data items about the two images. The difference between the photography position data items represents the straight distance between the positions a and b where the two images were photographed, as is illustrated in FIG. 5. In fact, however, the route the user traveled is not always straight. As shown in FIG. 5, too, the route may be route R1 or route R2, either being a bending one. Moreover, even if the user traveled the same route, the time he or she spent differ in accordance with how he or she traveled. If the user traveled by car, the time was shorter than traveling on foot.

In the present embodiment, the route the user traveled and how the user traveled the route are determined from the speed V calculated in Step S38 and the 2D map image selected in Step S39. The direction in which the user traveled is the direction he or she moved, in the route determined, from any photography position to any other photography position later in time.

Figure 6:
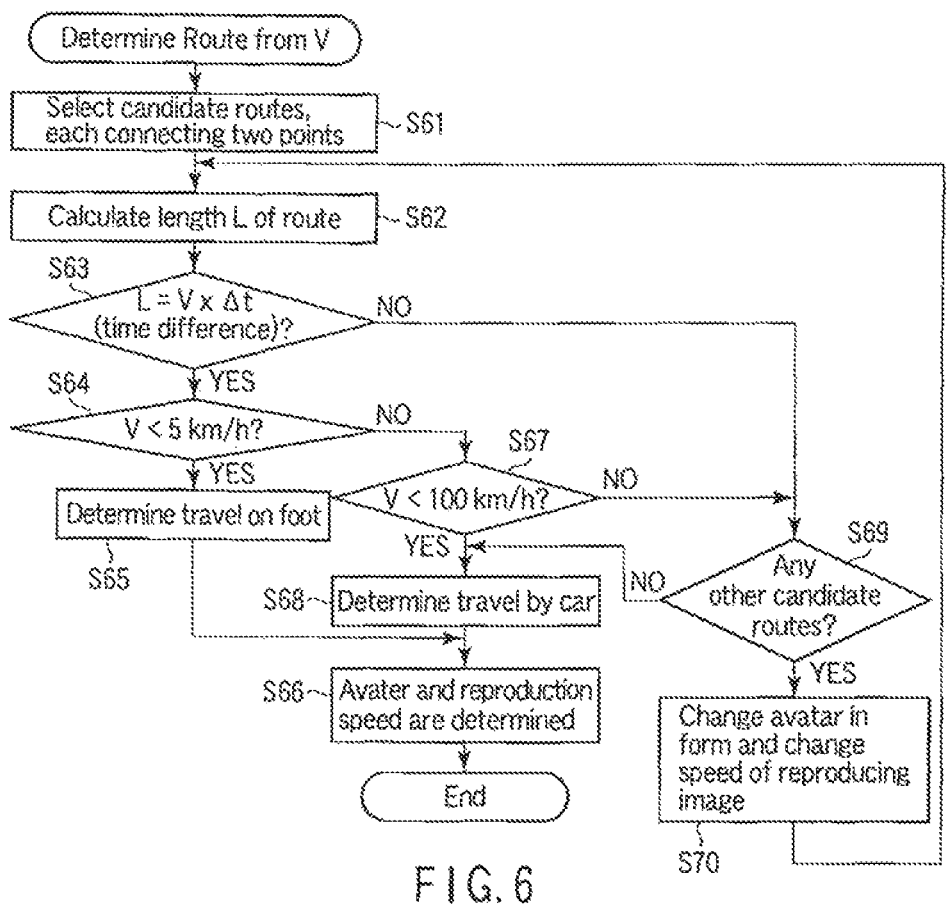
FIG. 6 is a flowchart explaining a process of searching for a travel route.

FIG. 6 is a flowchart explaining a process of searching for a travel route. The route searching unit 205 selects, as candidate routes, the routes (e.g., roads), each connecting two positions of photography images, on the 2D map image selected the control unit 201 has selected (Step S61). The route searching unit 205 then selects any one of the candidate routes and calculates the length L of the route selected (Step S62). For example, the length L of the shortest route is calculated at first.

Next, the route searching unit 205 determines whether the product of the traveling speed V and the time difference Δt between the photography times is equal to the length L (Step S63).

Assume that two routes R1 and R2 of different lengths exist on the 2D map image as shown in FIG. 5. Then, if the user traveled in the route R1, the product of the speed V and the time difference Δt is L1. If the user traveled in the route R2, the product of the speed V and the time difference Δt is L2. Hence, the route the user traveled while taking pictures can be determined.

In Step S63, the product of the speed V and the time difference Δt may be equal to the length L, the route selected now is considered to be the very route the user did travel while taking pictures. In this case, the route searching unit 205 determines whether the travel speed V is lower than 5 km/h, at which at which the user is supposed to walk (Step S64). If the travel speed V is lower than 5 km/h, the route searching unit 205 determines that the user walked while taking pictures (Step S65). Then, the avatar, which has been synthesized at the time of reproducing memorial images, is changed to a walking person, and the speed of reproducing the memorial images is changed to one that accords with the walking speed (Step S66).

Figure 7:
FIG. 7 is a diagram showing an avatar for an automobile used as means of traveling.

In Step S64, if the travel speed V is equal to or higher than 5 km/h in Step S63, the route searching unit 205 determines whether the travel speed is lower than 100 km/h (Step S67). If the travel speed is lower than 100 km/h in Step S67, the route searching unit 205 determines that the user traveled by car (Step S68). In this case, the avatar, which has been synthesized at the time of reproducing memorial images, is change to one appropriate for cars, e.g., an image of the front-glass frame 408 shown in FIG. 7. At the same time, the speed of reproducing the memorial images is changed to one that accords with the car speed V.

The user may travel not only on foot or by car, but may travel aboard a ship. If the travel route is on the sea, the avatar may be an image of a ship.

If the product of the travel speed V and the time difference Δt between the photography times is not equal to L in Step S63, or if the travel speed V is equal to or higher than 100 km/h in Step S67, the route searching unit 205 determines whether any other candidate route exits (Step S69). If no other routes exist in Step S69, the process goes to Step S68. In Step S68, the route searching unit 205 determines that the user traveled by car.

Any other candidate routes may exist in Step S69. In this case, the route searching unit 205 selects the next route (Step S70). Then, the process returns to Step S62. Then, the route searching unit 205 performs the process on the next route candidate.

The route searching process described above can correctly determine the very route the user traveled while taking pictures, even if a plurality of candidate travel routes exist on the map. Moreover, an avatar that accords with the mode of travel can be synthesized with the image.

How the virtual-scene generation server operates will be further explained, again with reference to the flowchart of FIG. 4. After the travel route has been determined, the control unit 201 selects an image that corresponds to a specific position on the travel route (Step S41). A plurality of images may be selected. That is, the image that should be seen at the specific position is selected, as a virtual scene image, from the 3D map image pertaining to the route. At this point, virtual photography date and time, which correspond to the specific position selected, are inferred (from the travel speed V) and associated with the specific position.

The image corresponding to the specific position may be synthesized from a satellite photograph or an aerial photograph. Alternatively, an image photographed by any other user at the specific position on the travel route may be utilized, if available, as that image.

Thereafter, the control unit 201 determines whether the camera 100 has requested that an avatar be synthesized when memorial images are reproduced (Step S42). If the camera 100 is found not requesting for the synthesis of an avatar in Step S42, the control unit 201 arranges an image at the specific position on the travel route, between the two images received (Step S43). If a plurality of images exist at the specific position, they will be arranged in the order equivalent to the direction of travel. Then, the control unit 201 generates one image file consisting of the two images transmitted from the user and the images each corresponding to a specific position (Step S44). If the memorial images should displayed on a 2D map image, the image file will include the 2D map image selected in Step S39. After generating the image file, the control unit 201 transmits the image file to the camera 100 (Step S45).

If the camera 100 is found requesting for the synthesis of an avatar in Step S42, the control unit 201 selects one of the two images received, which has been photographed earlier than the other (Step S46). Hereinafter, the image selected in Step S46 shall be referred to as "prior image." Next, the control unit 201 specifies the direction (view direction) in which the prior image as been photographed, on the basis of the topography represented by the prior image (Step S47). The control unit 201 then transmits the data representing the photography direction to the virtual-scene generation unit 206. From the 3D map image, the virtual-scene generation unit 206 generates a virtual scene image that should be displayed in association with the position where the prior image was photographed (Step S48). The virtual scene image is one the user saw while traveling forward in the route determined by the route searching unit 205. If the direction in which the prior image was photographed is identical to the direction the user traveled, the virtual scene image generated will be identical to the prior image.

The virtual-scene generation unit 206 synthesizes an avatar in the foreground of the virtual scene image generated (Step S49). Now that the avatar has been synthesized with the virtual scene image, the image reproduced can be more real than otherwise. Next, the virtual-scene generation unit 206 generates, from the 3D map image, a virtual scene image associated with the specific position in the route determined in Step S40 (Step S50). Further, the virtual-scene generation unit 206 synthesizes the avatar with the virtual scene image thus generated (Step S51). Thereafter, the travel direction is switched in the 3D map image, in accordance with the travel route, and a position is selected for the next position (Step S52).

After the travel direction has been switched in the 3D map image, the virtual-scene generation unit 206 determines whether the position selected corresponds to the photography date of any received image that was photographed later in time (hereinafter called "later image") (Step S53). If the position does not correspond to the photography date of the later image in Step S53, the process will return to Step S50. In this case, the virtual-scene generation unit 206 generates a virtual scene image that corresponds to the position selected. In Step S53, the position may be found to correspond to the photography date of the later image in Step S53. In this case, the virtual-scene generation unit 206 generates a virtual scene image that corresponds to the position of the later image (Step S54). Thereafter, the virtual-scene generation unit 206 synthesizes the avatar with the virtual scene image generated (Step S55). Then, the process goes to Step S44, in which an image file is generated from each virtual scene image synthesized with an avatar. The image file is reproduced in the camera 100, thus reproducing such memorial images as shown in FIG. 2.

Second Embodiment

A second embodiment of this invention will be described with reference to FIG. 8. FIG. 8 is a diagram showing a virtual scene display system that includes a virtual image generation apparatus according to the second embodiment of the invention. The second embodiment differs from the first embodiment, in the configuration of the virtual-scene generation unit 206. The virtual-scene generation unit 206 of the second embodiment has a direction output unit 2061 and an image synthesis unit 2062. The direction output unit 2061 has a direction detection unit 2061a and an opposite-direction detection unit 2061b. The direction detection unit 2061a detects a photography direction from the photography position data about the image input and the background scene of the image input. The opposite-direction detection unit 2061b detects the direction that is opposite (rotated by 180°) to the direction the direction detection unit 2061a has detected. From the era-classified map database 204, the image synthesis unit 2062 acquires, as a virtual scene image, the scene image seen in the direction detected by the opposite-direction detection unit 2061b. The image synthesis unit 2062 then synthesizes, if necessary, the image of the photographer who has taken the input image, with the scene image acquired. The virtual scene image the image synthesis unit 2062 has acquired therefore corresponds to the image of the scene that the object saw in the very direction, that is, the image that the photographer of the input image existed.

Figure 9:
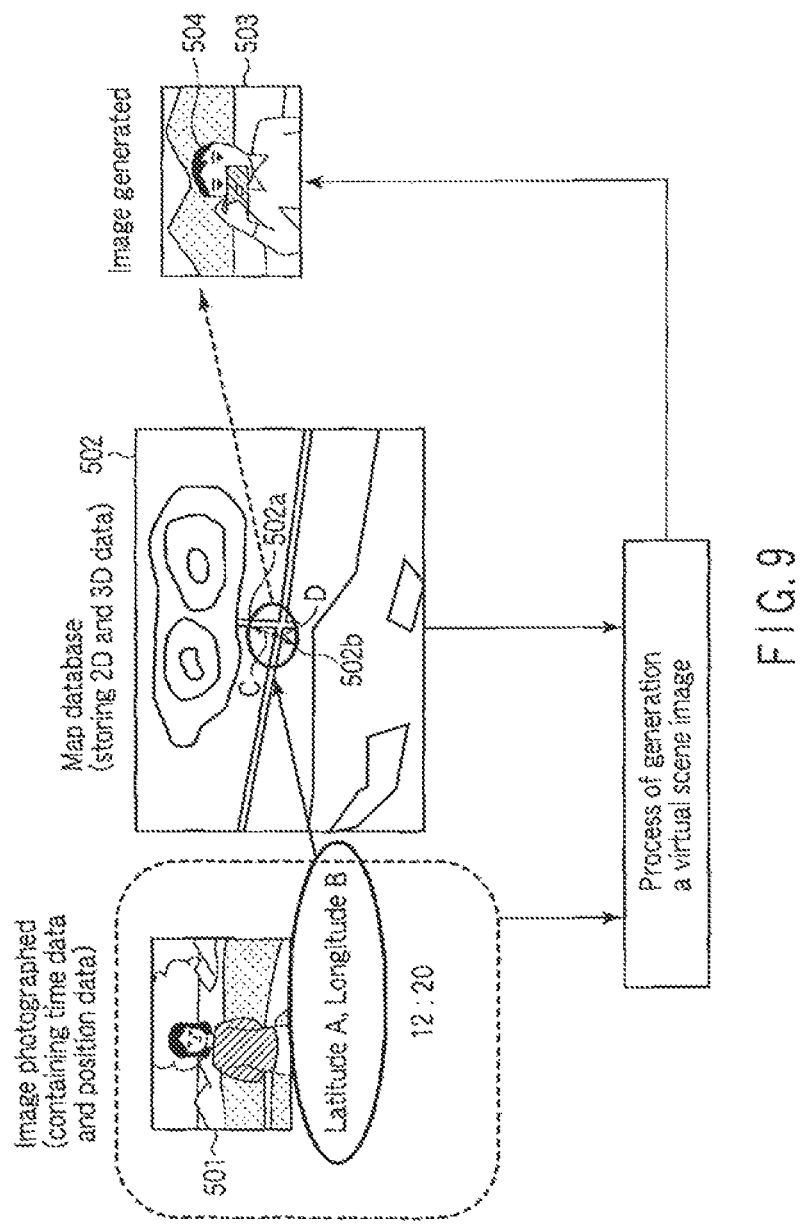
FIG. 9 is a diagram outlining how the virtual scene display system of FIG. 8 operates.

How the virtual travel display system of FIG. 8 operates will be explained. FIG. 9 is a diagram outlining how the virtual scene display system of FIG. 8 operates.

In this embodiment, when an object is photographed, the data representing the image of the object is recorded into the recording unit 106, in association with the photography position and the photography date and time.

The user may operate the input unit 102, setting the camera 100 to the memorial-image reproduction mode. The user may then select an image recorded in the recording unit 106 of the camera 100. In this case, the data representing the image selected is transmitted from the camera 100 to the virtual-scene generation server. The image selected may be image 501 shown in FIG. 9. This image 501 has been taken at 12:20 at the position of latitude A and longitude B.

When the virtual-scene generation server receives the data representing the image 501, a 2D and 3D map image, both including the position where the image 501 was taken, are acquired from the era-classified map database 204. Thereafter, the direction the direction detection unit 2061a of the virtual-scene generation unit 206 detects the photography direction of the image 501 from the scene in the image 501. After the photography direction of the image 501 has been detected, the opposite-direction detection unit 2061b identifies the direction that is opposite (rotated by 180°) to the photography direction of the image 501. It is in the opposite direction that the object faces the camera 100 when the image 501 was taken. To detect the photography direction, it suffices to perform pattern matching between the image and the map image. The direction will be more accurately detected if the data about the weather and time at the time of taking the picture are taken into account in the pattern matching.

When the opposite-direction detection unit 2061b identifies the direction opposite to the photography direction, the image synthesis unit 2062 generates a virtual scene image 503 that the object may have seen, from the 3D map image stored in the era-classified map database 204. The image synthesis unit 2062 then synthesizes the virtual scene image with the object's image 504, as needed.

The user can therefore view the virtual scene image that he or she could see at the photography position, though only the image 501 was actually taken at the photography position.

How the virtual scene display system of FIG. 8 operates will be explained in detail. Note that the camera 100 is operated in the same way as described in conjunction with the first embodiment. Therefore, how the camera 100 is operated in the second embodiment will not be explained.

In the second embodiment, only one image needs be selected in Step S13 of performing a control in the camera 100. In Step S14, the control unit 201 waits for a photographer's instruction, as to whether the photographer image should be synthesized with a virtual scene image in the memorial-image reproduction mode (described later) and what type of an image the photographer image should be if synthesized with the virtual scene image. Further, in Step S15 of displaying an image, the control unit 101 performs a memorial-image reproduction process on the basis of the image file transmitted from the server 200, to cause the display unit 107 to display the image of the scene that the object seems to have seen when taking the picture. The memorial-image reproduction process will be described later.

Figure 10:
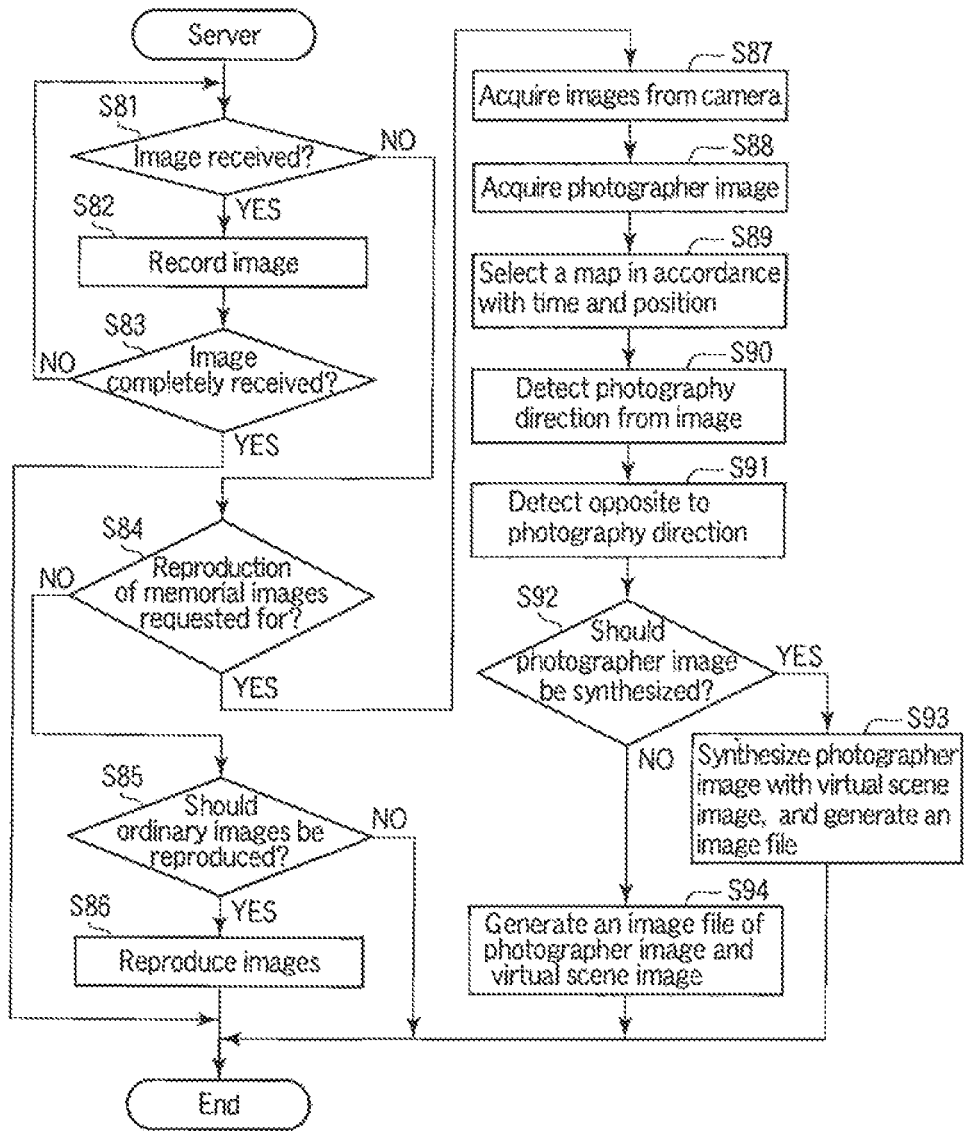
FIG. 10 is a flowchart explaining how a virtual-scene generation server operates in the virtual scene display system of FIG. 8.

FIG. 10 is a flowchart explaining how a virtual-scene generation server operates in the virtual scene display system of FIG. 8. Steps S81 to S83 shown in FIG. 10 are identical to Steps S31 to S33 shown in FIG. 4, and will not be explained in conjunction with the second embodiment.

In Step S81 no image data may be found received. If this is the case, the control unit 201 determines whether a request for memorial-image reproduction has been made along with a request for image data items (Step S84). If a request for memorial-image reproduction is found not made, in Step S84, the control unit 201 determines whether the camera 100 has requested for reproduction of ordinary images (Step S85). In Step S85, a request may be found made for ordinary-image reproduction. In this case, the control unit 201 transfers, to the camera 100, the data items representing the images the user has selected. In the camera 100, the display unit 107 displays the images represented by these data items (Step S86).

A request for memorial-image reproduction may be found to have been made in Step S84. In this case, the control unit 201 acquires the data items representing the images and transmitted from the camera 100 (Step S87). Next, the control unit 201 acquires data about the setting of photographer information, which has been transmitted from the camera 100 (Step S88). If the image data representing the photographer from the camera 100 is transmitted, the control unit 201 will acquire this image data as data representing an image of the photographer. If the server is requested to synthesize an image recorded in the photographer image database 208, the control unit 201 will acquire the data representing this image as data representing an image of the photographer.

Thereafter, the control unit 201 selects, from the era-classified map database 204, a 2D and a 3D map image which are of the same era as the image sent from the camera 100 and which include the position where the image was taken, in accordance with the photography date-time data and photography position data that are added to the image data acquired (Step S89). Then, the control unit 201 transmits the 2D and 3D map images, thus selected, to the virtual-scene generation unit 206. In the virtual-scene generation unit 206, the direction detection unit 2061*a* detects the photography direction of the image sent from the camera 100, from the scene in the image sent from the camera 100 (Step S90). The direction detection unit 2061*a* then selects, from the 3D map image, images the photographer could see at the photography position (i.e., scenes that existed all around (360°) the photographer at the time of photography). Further, the direction detection unit 2061*a* performs a matching process on each image selected and the image sent transmitted from the camera 100, selecting the scene image most similar to the image sent from the camera 100. The unit 2061*a* selects the direction in which the most similar scene image, as photography direction. The scene image at position 502*a* shown in FIG. 9, for example, may be found most similar to the image sent from the camera 100. In this case, the direction selected is one indicated by arrow C in FIG. 9. After the photography direction has been detected, the opposite-direction detection unit 2061*b* of the virtual-scene generation unit 206 detects the direction opposite to the photography direction (i.e., direction different by 180 from the photography direction, or the direction of arrow D in FIG. 9) (Step S91).

After the opposite direction has been detected, the control unit 201 determines whether the synthesis of the photographer image has been set, from the data about the setting of photographer information (Step S92). If the synthesis of the photographer image has been set in Step S92, the control unit 201 selects the images of the scenes that existed all around (360°) the photographer, as virtual scene images. Of the virtual scene images selected, the virtual scene image associated with the position (i.e., position 502*b* in FIG. 9) in the opposite direction detected in Step S91 is selected. Then, the control unit 201 supplies the virtual scene image selected, to the image synthesis unit 2062. The image synthesis unit 2062 synthesizes the photographer image acquired in Step S88 with the virtual scene image supplied from the control unit 201. The control unit 210 generates an image file consisting of the virtual scene images existing around the photography position, including the virtual scene image synthesized with the photographer image (Step S93). If the synthesis of the photographer image has not been set in Step S92, the control unit 201 selects the images of the scenes that existed all around (360°) the photographer, as virtual scene images. Then, the control unit 210 generates an image file consisting of the virtual scene images selected and the photographer image acquired in Step S88 (Step S94). The memorial image file thus generated contains the data representing the opposite direction detected in Step S91. Thus, the virtual scene images and the photographer image are recorded, not synthesized together, in the image file. Hence, the virtual scene images and the photographer image can be synthesized in the camera 100, too.

FIG. 11 is a flowchart explaining a process of setting the photographer image. The process of setting the photographer image is performed in, for example, Step S14 shown in FIG. 3. The user (i.e., photographer) can therefore select any desired photographer image from the images recorded in the photographer image database 208. The setting of the photographer image can be accomplished in any PC connected to the virtual-scene generation server via a network.

Figure 12A:
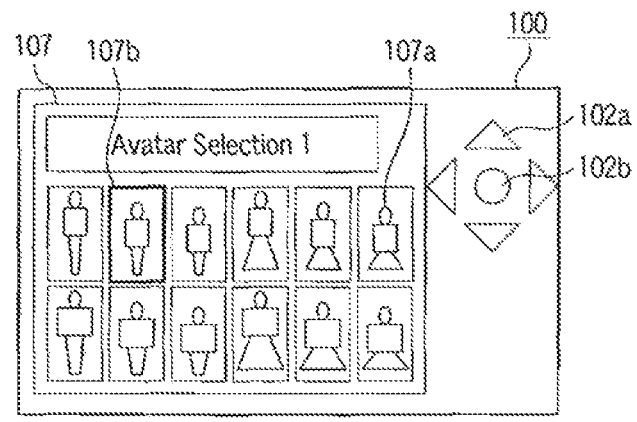
FIGS. 12A, 12B and 12C are a flowchart explaining images a display unit may display in a process of setting a photographer image.

In the process of setting the photographer image, the control unit 101 receives the images of candidate avatars from the virtual-scene generation server. The images of candidate avatars, which are thumbnail images, are displayed as images 107*a* shown in FIG. 12A. The control unit 101 then waits for any candidate avatar selected by the user (Step S101). The control unit 101 determines whether the user has selected a candidate avatar (Step S102). Until a candidate avatar is selected, Steps 101 and 102 are repeated. In Step S101, sex and an external form can be selected for the candidate avatar selected. That is, the user may operate the cross key 102*a* and the OK button 102*b* provided on the input unit 102, moving the cursor 107*b* to the desired one of the thumbnail images the display unit 107 displays. The user can thus select an avatar having the external form he or she likes.

Figure 12B:
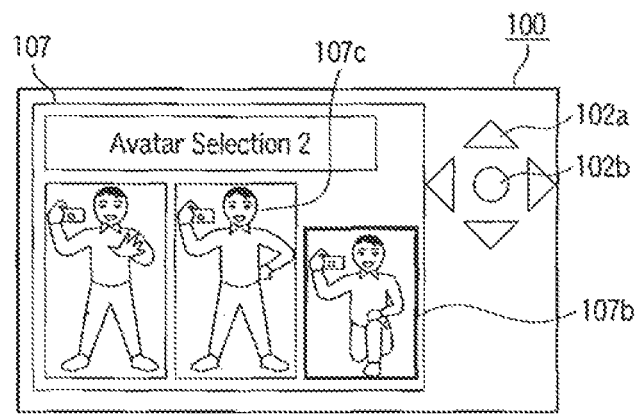

If a candidate avatar is selected in Step S102, the control unit 101 receives images of avatars, which correspond to the external form of the candidate avatar selected. Then, the control unit 101 causes the display unit 107 to display thumbnail images for the candidate avatar received, as reference number 107*c* shows in FIG. 12B. The control unit 101 then waits until the user selects one of the thumbnail images thus displayed (Step S103). Next, the control unit 101 determines whether the user has selected an avatar (Step S104). Until the user selects an avatar, the control unit 101 repeats Steps S103 to S104. In Step S103, the user can select a desired pose for the avatar. That is, the user may operates the cross key 102*a* and the OK button 102*b* provided on the input unit 102 to move the cursor 107*b* to the desired one of the thumbnail images the display unit 107 displays. The user can thus select an avatar selected in Step S101 and having the pose he or she likes.

If a candidate avatar is selected in Step S104, the control unit 101 generates an image of the candidate avatar having the pose selected. The control unit 101 then causes the display unit 107 to display the candidate avatar as an image that may be confirmed by the user (Step S105). Thereafter, the control unit 101 determines whether the user has confirmed the image displayed (Step S106). More precisely, whether the user has operated the OK button 102*b* is determined. If the user has not operated OK button 102*b* in Step S106, the process will return to Step S103, in which the control unit 101 waits for an avatar selected.

Figure 12C:
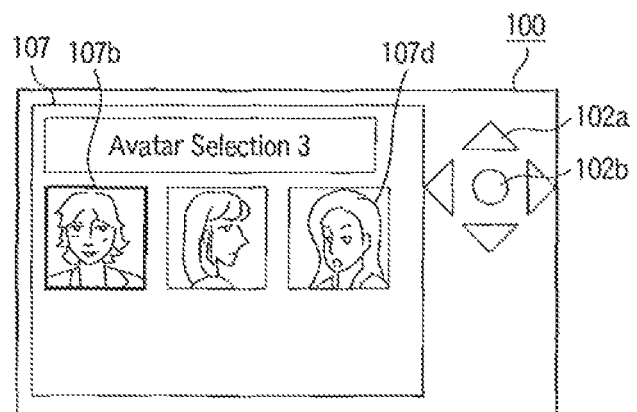

If the user has operated OK button 102*b* in Step S106, the control unit 101 performs communication with the virtual-scene generation server and determines whether the real image (i.e., image the photographer has registered) representing the user, i.e., photographer, is recorded in the photographer image database 208 of the virtual-scene generation server (Step S107). If the real image is not recorded in Step S107, the control unit 101 terminates the process of FIG. 11. If the real image is recorded in Step S107, the control unit 101 receives the read image from the virtual-scene generation server. The control unit 101 then causes the display unit 107 to display the thumbnail image 107d of the real image as is illustrated in FIG. 12C. Next, the control unit 101 waits until the user selects the real image (Step S108). At this point, the control unit 101 determines whether the user has selected the real image that may become a candidate avatar (Step S109). Until the real image is selected, the control unit 101 repeats Steps S108 and S109.

If the real image that will become a candidate avatar is selected in Step S109, the control unit 101 synthesizes the face part of the real image with the face part of the candidate avatar generated in Step S105 (Step S110). Thereafter, the control unit 101 terminates the process of FIG. 11.

The avatar image thus acquired by synthesis is transmitted to the virtual-scene generation server, in response to a request for the reproduction of memorial images. The avatar image is synthesized, if necessary, with the virtual scene image in the process of generating a memorial image file. A photographer image can thereby generate even if the photographer has not taken his or her own image. The photographer image is synthesized with the virtual scene image. This enables the photographer to view an image showing not only his image but also the scene that he or she actually saw when photographing his or her image, though the scene was not photographed at that time. This image helps the user to remember the scene he or she saw at the time of photographing his or her image.

Figure 13:
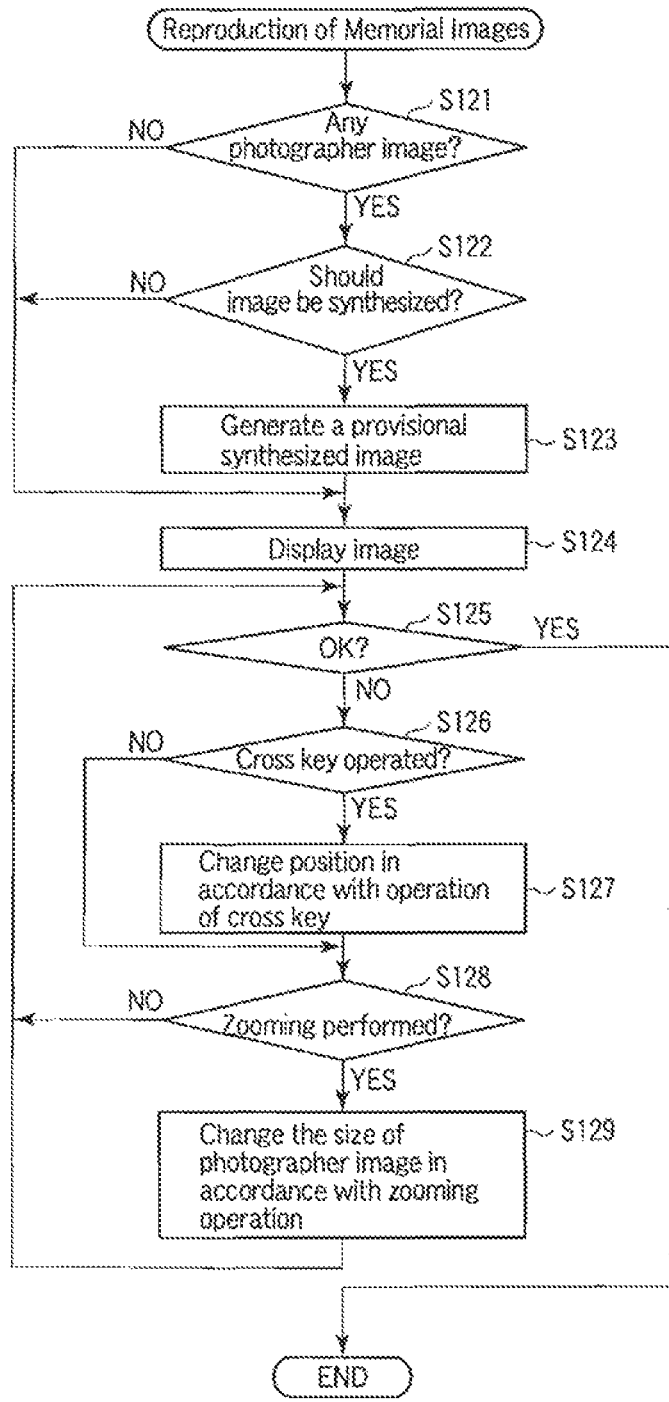
FIG. 13 is a flowchart explaining a process of reproducing memorial images.

FIG. 13 is a flowchart explaining a process of reproducing memorial images in the camera 100. The present embodiment is configured to synthesize a virtual scene image with a photographer image in the process of reproducing memorial images, too.

Figure 14A:
FIGS. 14A, 14B, 14C and 14D are diagrams explaining how to synthesize an image to achieve the reproduction of memorial images.
Figure 14B:
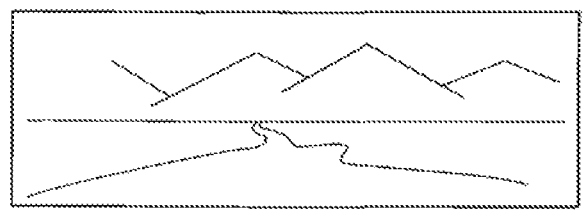

After the memorial image file has been received and the user has instructed the reproduction of memorial images, the control unit 101 determines whether the file contains the photographer image (or whether the photographer image has not been synthesized in the virtual-scene generation server) (Step S121). If the memorial image file contains the photographer image Step S121, the control unit 101 determines whether the user has instructed that the photographer image be synthesized with the virtual scene image (Step S122). If the user has instructed so in Step S122, the control unit 101 synthesizes such a photographer image as shown in FIG. 14A with the virtual scene image as shown in FIG. 24B, which was seen in the direction opposite to the photography direction (Step S123).

Figure 14C:
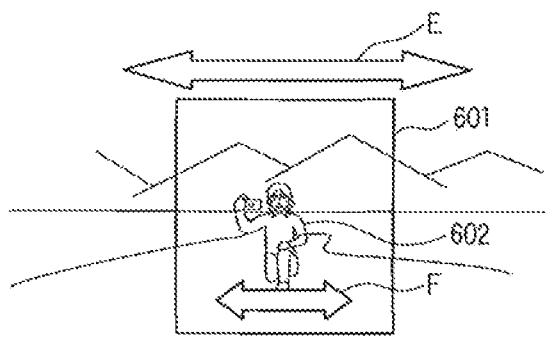
Figure 14D:

After Step S121, Step S122, or Step S123, the control unit 101 causes the display unit 107 to display the virtual scene image (Step S124). In the process of reproducing the memorial images, the control unit 101 determines whether the user has operated the OK button (Step S125). If the user has operated the OK button, the control unit 101 terminates the process of FIG. 13. Thereafter, the memorial image file containing the virtual scene image 601a shown in FIG. 14C is recorded in into the recording unit 106 in accordance with the user's operation at the input unit 102.

If the user has not operated the OK button in Step S125, the control unit 101 determines whether the user has operated the left or right part of the cross key 102a (Step S126). If the cross key 102a has been operated in Step S126, the control unit 101 selects another virtual scene image recorded in the image file in accordance with that part of the cross key 102a, which has been operated. Then, the photographer image is synthesized again with the virtual scene image selected, thus changing the position of synthesizing the photographer image (Step S127). The user can thus select any one of the virtual scene images that exist in the direction of arrow E in FIG. 14C (all around all around (360°) the photographer), by operating the left and right parts of the cross key 102a. Assume that the user pushes, for example, the right part of the cross key 102a. In this case, the virtual scene image on the right of the virtual scene image 601 will be selected. Then, the photographer image 602 is synthesized in the center part of the virtual scene image selected. Assume that the user pushes the left part of the cross key 102a. If this is the case, the virtual scene image on the left of the virtual scene image 601 will be selected. Then, the photographer image 602 is synthesized in the center part of the virtual scene image selected.

After Step S126 or Step S127 has been performed, the control unit 101 determines whether the user has performed zooming (Step S128). If the user has performed zooming in Step S128, the control unit 101 enlarges or reduces the photographer image in accordance with the direction the zooming button has been moved. The photographer image, either enlarged or reduced, synthesized again with the virtual scene image, thereby changing the size of the photographer image (Step S129). The user may operate the zooming button to enlarge or reduce the photographer image in the direction of arrow F in FIG. 14C. More specifically, the photographer image will be enlarged if the user presses the zoom-up part of the zooming button, and will be reduced if the user presses the zoom-down part of the zooming button.

As has been explained, the present embodiment forms an image, e.g., a scene image, which the user did not photographed when he or she took pictures, from 3D map image data. Viewing the image thus formed, the user can vividly remember what he or she did while traveling from one photography position to another.

The present invention has been described with reference to an embodiment. Nevertheless, the invention is not limited to the embodiment. Various changes and modifications can, of course, be made within the scope and spirit of the invention. For example, a series of images may be compressed by mean of inter-frame compression, providing one image file, thought in the embodiment, a series of images generated from a 3D map image are not compressed and compiled into one image file. If the images are so compressed, the resulting image file is smaller in size, and can therefore be transmitted in a shorter time and can save the storage area for recording the file.

The embodiment described above is a system that comprises the camera 100 and the virtual-scene generation server. Nonetheless, the camera 100 may be replaced by a PC or a cellular telephone. That is, any apparatus that has at least a display unit can be used in place of the camera 100.

The virtual scene image is not limited to one prepared from a 3D map image. Rather, it may be prepared from a satellite photograph or an aerial photogram.

The prior image and the later image need not be transmitted to the virtual-scene generation server from the camera 100. They may be input to the server from any apparatus other than the camera 100.

Further, although the embodiment described above is a system comprising the camera 100 and the virtual-scene generation server, the camera 100 may be replaced by a personal computer (PC) or a cellular telephone. Any apparatus that has a unit for displaying images can be used in place of the camera 100.

What is claimed is:

1. An image generation apparatus comprising:
   a position detector that acquires photography position information;
   a communicator that acquires at least one surrounding map image viewable from the photography position when a captured image is captured; and
   an image generator that generates at least one virtual image of a selected avatar image and the at least one surrounding map image.

2. The image generation apparatus according to claim 1, wherein the at least one surrounding map image comprises a scene image of a direction that is opposite to the photography direction.

3. The image generation apparatus according to claim 1, wherein the image generator includes an opposite direction detector that detects a direction that is opposite to the photography direction.

4. The image generation apparatus according to claim 3, wherein the at least one surrounding map image comprises a scene image of a direction that is opposite to the photography direction detected by the opposite direction detector.

5. The image generation apparatus of claim 1, further comprising an imager that captures the captured image.

6. The image generation apparatus of claim 1, wherein the photography position information correspond to a photography position of the captured image.

7. The image generation apparatus of claim 1 further comprising an output that outputs the at least one virtual image to a display.

8. The image generation apparatus of claim 1, wherein the photography position information comprises latitude and longitude information corresponding to the photography position.

9. The image generation apparatus of claim 1, further comprising a map-image database that communicates with the communicator and acquires at least one map image corresponding to the photography position information of the captured image.

10. The image generation apparatus of claim 9, wherein the at least one map image is consistent with a date and time that the captured image is captured.

11. The image generation apparatus of claim 10, wherein the map-image database comprises an era-classified map database.

12. The image generation apparatus according to claim 1, wherein the avatar image is an image related to a photographer of the captured image.

13. The image generation apparatus according to claim 1, wherein the avatar image is selected based on sex or an external form.

14. The image generation apparatus according to claim 1, wherein the image generator generates the at least one virtual image of a scene viewable from the photography position when the captured image was captured based on the photography position information and the at least one surrounding map image.

15. The image generation apparatus according to claim 14, wherein the virtual image generator includes an image synthesis unit that synthesizes the virtual image with the avatar image.

16. The image generation apparatus according to claim 1, wherein the image generator generates a scene from the map image that is most similar to the captured image when it detects the photography direction of the captured image.

17. The image generation apparatus according to claim 1, wherein the at least one surrounding map image comprises map images along a 360 degree view point from the photography position.

18. An image generation system comprising:
    a position detector that acquires photography position information corresponding to a photography position of a captured image;
    a communicator that communicates with the position detector and acquires at least one surrounding map image viewable from the photography position when the captured image is captured; and
    an image generation server that communicates with at least one of the position detector and the communicator to generate at least one virtual image of a selected avatar image and the at least one surrounding map image.

19. An image generation method comprising:
    acquiring photography position information;
    acquiring at least one surrounding map image viewable from the photography position when a captured image is captured; and
    generating at least one virtual image of a selected avatar image and the at least one surrounding map image.

* * * * *